US012284181B2

(12) United States Patent
Yao

(10) Patent No.: US 12,284,181 B2
(45) Date of Patent: Apr. 22, 2025

(54) MAC ADDRESS AND CONTROLLED PORT BASED NETWORK ACCESS MANAGEMENT

(71) Applicant: Palo Alto Networks, Inc., Santa Clara, CA (US)

(72) Inventor: Yinghui Yao, San Ramon, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 174 days.

(21) Appl. No.: 18/163,764

(22) Filed: Feb. 2, 2023

(65) Prior Publication Data

US 2024/0267377 A1 Aug. 8, 2024

(51) Int. Cl.
| | |
|---|---|
| G06F 21/44 | (2013.01) |
| G06F 21/43 | (2013.01) |
| H04L 9/40 | (2022.01) |
| H04W 12/06 | (2021.01) |
| G06F 21/35 | (2013.01) |
| H04W 48/20 | (2009.01) |
| H04W 80/02 | (2009.01) |

(52) U.S. Cl.
CPC ........ H04L 63/0876 (2013.01); H04L 63/108 (2013.01); H04L 63/20 (2013.01)

(58) Field of Classification Search
None
See application file for complete search history.

(56) References Cited

U.S. PATENT DOCUMENTS

| 7,962,954 B2 * | 6/2011 | Zavalkovsky | H04L 63/0876 |
| | | | 726/4 |
| 10,917,406 B2 * | 2/2021 | Xu | H04L 63/0876 |
| 2006/0179307 A1 * | 8/2006 | Stieglitz | H04W 12/062 |
| | | | 713/168 |
| 2007/0082656 A1 * | 4/2007 | Stieglitz | H04L 63/08 |
| | | | 713/168 |

(Continued)

FOREIGN PATENT DOCUMENTS

CA     2479795 C  *  3/2013  ..........  H04W 12/003

OTHER PUBLICATIONS

Using Random Bit Authentication to Defend IEEE 802.11 DoS Attacks. Lee. JISE. (Year: 2009).*

(Continued)

*Primary Examiner* — Venkat Perungavoor
(74) *Attorney, Agent, or Firm* — Gilliam IP PLLC

(57) ABSTRACT

A set of software components has been created to form a path of execution outside of a kernel that triggers the authentication process based on MAC address determination for connected stations and separately managing that authentication per controlled port shared across stations. The architecture of the set of software components includes a control daemon that interacts with objects and services of the network access point OS or kernel to leverage dynamic host configuration protocol (DHCP) snooping and MAC address learning to determine MAC addresses. The control daemon instantiates an authenticator object/service for each controlled port and interacts with the authenticator object/

(Continued)

service to cause an authenticator service of the OS to perform the authentication process for stations. The control daemon also leverages an Ethernet frames rules table of the kernel to authorize traffic of authenticated stations via the controlled port.

23 Claims, 5 Drawing Sheets

(56) References Cited

U.S. PATENT DOCUMENTS

| | | | | |
|---|---|---|---|---|
| 2008/0045180 | A1* | 2/2008 | Yang | H04W 12/033 380/247 |
| 2012/0054359 | A1* | 3/2012 | Yamada | H04L 63/0869 709/229 |
| 2016/0366040 | A1* | 12/2016 | Nampelly | H04L 43/50 |
| 2020/0120085 | A1* | 4/2020 | Comay | H04L 63/20 |

OTHER PUBLICATIONS

"Ebtables(8)—Linux man page", [online], [retrieved on Feb. 2, 2023] Retrieved from the Internet: <https://linux.die.net/man/8/ebtables>.

Al Naamany, et al., "IEEE 802.11 Wireless LAN Security Overview", IJCSNS International Journal of Computer 138 Science and Network Security, vol. 6 No. 5B, May 2006, 19 pages.

* cited by examiner

MAC ADDRESS AND CONTROLLED PORT BASED NETWORK ACCESS MANAGEMENT

BACKGROUND

The disclosure generally relates to digital transmission of data (e.g., CPC subclass H04L) and security aspects corresponding to the data link layer (e.g., subclass H04L 63/162).

The Institute of Electrical and Electronics Engineers (IEEE) provides a standard identified as 802.1X for port-based network access control to restrict the use of networks complying with the IEEE 802 family of standards (local area networks, personal area networks, and metropolitan area networks). The 802.1X standard can be used for stations connected to a bridge by wired or wireless connection. The 802.1X standard relies on an authentication server (remote authentication dial-in user service (RADIUS) server) for authentication of stations. Authentication can be according to any one of various authentication methods stemming from the Extensible Authentication Protocol (EAP).

BRIEF DESCRIPTION OF THE DRAWINGS

Embodiments of the disclosure may be better understood by referencing the accompanying drawings.

DETAILED DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

While the 802.1X standard allows a network access point (e.g., a bridge) to securely control network access, variations in network access point configurations and variations in operating systems (OS) of stations are "gaps" in the process and lead to delays in the authentication process. For instance, some operating systems do not send out EAP over LAN (EAPoL) start or logoff messages to facilitate a station starting or terminating an 802.1X session. Such a delay is noticeable which negatively impacts user experience and leaves a network vulnerable to attacks. A set of software components has been created and organized into an architecture that fills these gaps with a path of execution outside of a kernel of the network access point. This path triggers the authentication process based on MAC address determination for connected stations and separately manages that authentication per controlled port shared across stations. The set of software components includes a control daemon that interacts with the network access point OS or kernel to leverage dynamic host configuration protocol (DHCP) snooping and MAC address learning to determine MAC addresses. The control daemon instantiates intermediaries (e.g., threads) that handle different aspects of the controlled port based network access management. In addition to monitoring for changes related to MAC addresses of connected stations, the control daemon launches intermediary authentication threads/objects and an intermediary authorization object/thread. The intermediary authentication threads/objects interact with a wired authenticator service for each controlled port to trigger authentication for a station. The control daemon uses the intermediary authorization object to leverage an Ethernet frames rules table of the kernel to authorize traffic of authenticated stations via the controlled port.

Example Illustrations

Figure 1:
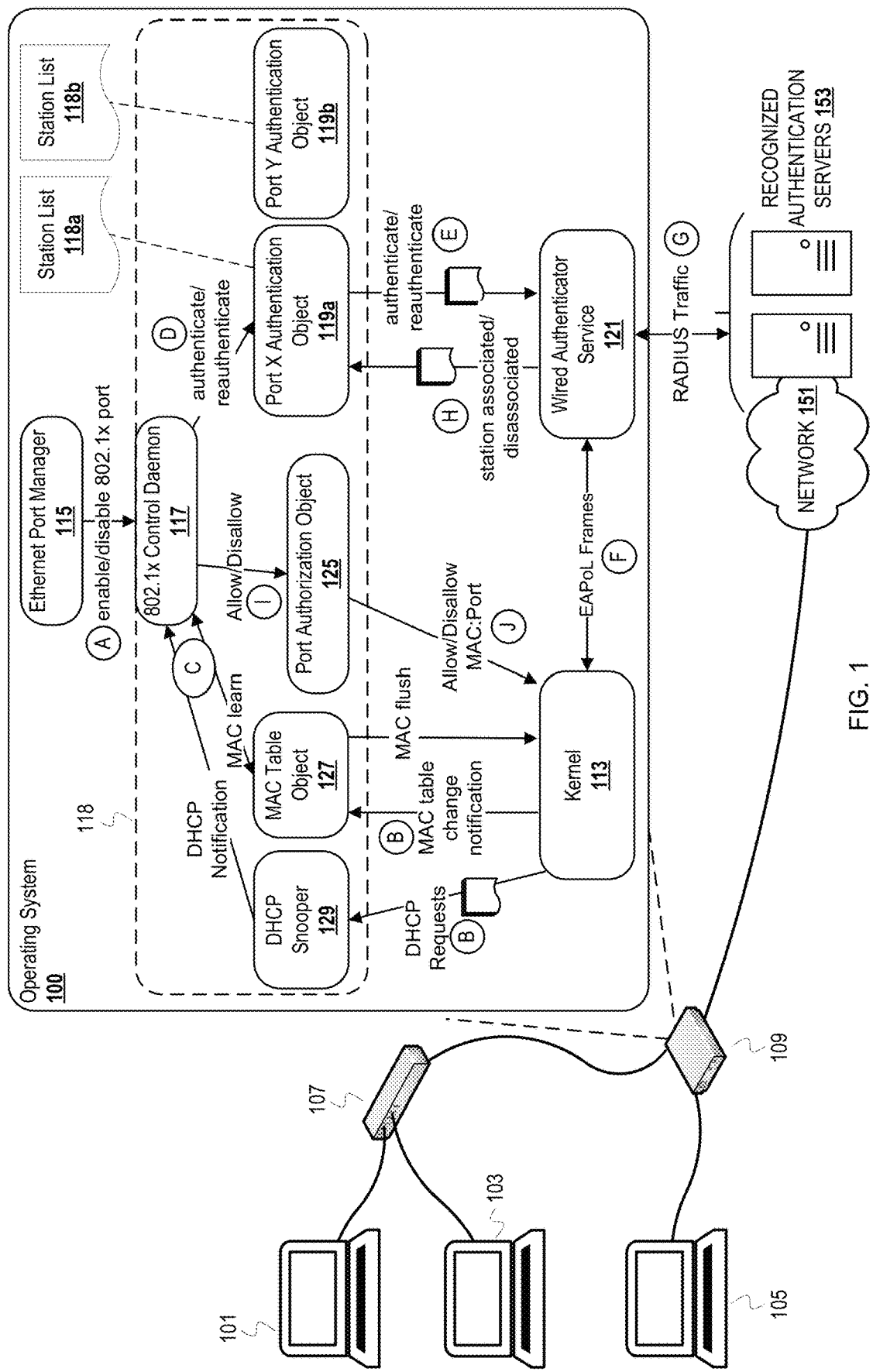
FIG. 1 depicts a network access point programmed with a set of software components for an authentication path for controlled port network access.

FIG. 1 depicts a network access point programmed with a set of software components for an authentication and authorization path for controlled port network access. A network access point 109 controls access to a network 151 according to the 802.1X standard. A station 101, a station 103, and a station 105 are connected via wired connections with a network access point 109. The stations 101, 103 indirectly connect with the network access point 109 via a switch 107. The station 105 is directly connected with the network access point 109. An operating system 100 of the network access point 109 includes a kernel 113, an Ethernet port manager 115, and a control daemon 117. These are launched when the network access point 109 starts or boots up. In addition, the OS 100 launches or instantiates a wired authenticator service 121 (e.g., wired hostapd). Software components that are threads/objects instantiated by the control daemon 117 are illustrated as executing or being instantiated within a memory space 118 of the control daemon 117.

FIG. 1 is annotated with a series of letters A-J. Each stage represents one or more operations. Although these stages have some ordering to introduce the secondary authentication path, the stages illustrate one example to aid in understanding this disclosure and should not be used to limit the claims. Many of the operations may be concurrent or overlapping. Subject matter falling within the scope of the claims can vary from what is illustrated.

At a stage A, the Ethernet port manager 115 indicates to the control daemon 117 which logical/virtual port is enabled for 802.1X. The Ethernet port manager 115 also indicates when 802.1X is disabled for a port. If 802.1X is enabled for a port, then the port is referred to as a "controlled" port and the 802.1X control daemon 117 uses this controlled port to restrict access to the network 151. If a station has been authenticated, then its traffic will be authorized/allowed on the controlled port. Otherwise, traffic of the station will not be forwarded from the network access point 109. When the Ethernet port manager 115 indicates to the control daemon 117 that 802.1X is disabled for a port, then that port is no longer used by the 802.1X control daemon. The Ethernet port manager 115 also communicates to the control daemon 117 when a physical port/interface is down.

At stage B, a MAC address for a station connected to the network access point 109 is detected or extracted. Stages B and C are indicated for multiple notification paths because the control daemon 117 can receive a notification from a DHCP snooper 129, a MAC address table object 127, or both. The order of arrival of the notifications for a same station is nondeterministic. The DHCP snooper 129 is provided by a service of the OS 100 (e.g., a packet capture (PCAP) service). When the control daemon 117 is launched, the control daemon 117 can send a request to the OS service to register for notifications of MAC addresses in DHCP requests detected by the DHCP snooper. The control daemon 117 instantiates the MAC address table object 127 based on a system call provided by an application of the OS 100 or the kernel 113 to access a MAC address table maintained in the kernel 113. As an example, the control daemon 117 can execute a script including OS commands to instantiate the DHCP snooper 129 and the MAC table object 127. When a DHCP request is detected in the kernel 113, the OS service corresponding to the DHCP snooper 129 passes a copy of the DHCP request to the DHCP snooper 129. When a MAC address is added or removed from the MAC address table in the kernel 113, the kernel 113 or OS 100 updates a variable of the MAC address table object 127 indicating the change and corresponding MAC address.

At stage C, the DHCP snooper 129 and/or the MAC address table object 127 notifies the control daemon 117 of a MAC address. The DHCP snooper extracts a MAC address from the DHCP request copy and communicates a notification (e.g., by inter-process communication (IPC)) to the control daemon 117 indicating the extracted MAC address. IPC can be implemented with control sockets, as an example. If the kernel 113 indicates a MAC address and either an insert or delete for that address, then a function of the MAC address table object 127 is executed which updates a table of MAC addresses maintained by the MAC address table object 127 and generates a notification to the control daemon 117 for the control daemon 117 to learn of the change. If the Ethernet port manager 115 indicates that a port is down, the control daemon 117 communicates a MAC flush to the kernel 113 via the MAC table object 127.

At stage D, the control daemon 117 calls a function of an authentication object to authenticate or reauthenticate a station depending on what the control daemon 117 learned. The control daemon 117 calls an authenticate function when a new MAC address is determined by the control daemon 117 (either by MAC learning or DHCP snooping). The control daemon 117 calls a reauthenticate function if the control daemon 117 learns of a station aging out. The OS 100 is depicted with two port bound authentication objects instantiated by the control daemon 117: authentication object 119a and authentication object 119b. Two authentication objects are depicted to convey that the control daemon 117 will instantiate an authentication object for each controlled port. The authentication objects 119a, 119b are respectively illustrated as associated with different controlled ports X and Y. This is to convey the architectural aspect of a 1:1 relationship between the authentication objects of the control daemon 117 and the controlled ports managed by the control daemon 117. This architectural aspect relates to the controlled ports being shared ports and network access being based on a combination of MAC address and port. For this illustration, the control daemon 117 calls the authenticate function for controlled port X, which corresponds to the authentication object 119a.

At stage E, the authentication object 119a sends a message to the wired authenticator service 121 as a result of the control daemon 117 calling the authenticate function exposed by the authentication object 119a. The authentication object 119a sends the message by invoking a function exposed by the wired authenticator service 121 (e.g., via a command socket). If the control daemon 117 had called the reauthenticate function of the authentication object 119a, then the call would have caused the authenticator service 119a to send a message to the wired authenticator service 121 requesting reauthentication of an indicated MAC address. FIG. 1 depicts station lists maintained by the authentication objects 119a, 119b. Specifically, the authentication object 119a maintains a station list 118a and the authentication object 118b maintains a station list 118b. When the control daemon 117 invokes the exposed authentication function, the authentication object 119a updates the station list 118a with the MAC address of the station to be authenticated. An authentication object can also indicate authentication state of a station, for example states authentication requested and authenticated/associated. If the control daemon 117 invokes the reauthentication function, then the indicated MAC address would already be in the station list. The eventual update would be a no-op if successful or removal if authentication fails.

At stage F, the wired authenticator service 121 initiates authentication of the indicated MAC address according to EAP over local area network (EAPoL). The wired authenticator service 121 transmits and receives EAPoL frames via the kernel 113. For example, the wired authenticator service 121 transmits messages to negotiate EAPoL with the station/supplicant identified in the message from the authenticator service 119a. Then the wired authenticator service 121 transmits an EAP-Request/Identity message to the station.

At stage G, the wired authenticator service 121 passes through the EAP-Response/Identity message from the station to one of recognized authentication servers 153. The wired authenticator service 121 passes the message through by encapsulating it in a RADIUS Access-Request message. Additional traffic is communicated between the authentication server 153 and the station until the process completes.

At stage H, the wired authenticator service 121 indicates either association or disassociation of a station. If the authentication process was successful, then the wired authenticator service 121 will message the authentication object 119a that the previously indicated station is now associated with the network access point 109. If the authentication process failed, then the wired authenticator service 121 sends a message to the authentication object 119a that the station is disassociated. Receipt of a message will trigger the authentication object 119a to convey the associated state or disassociated state to the control daemon 117 (e.g., via control socket) and update the station list 118a accordingly.

At stage I, the control daemon 117 interacts with a port authorization object 125 to set rules to allow/authorize or disallow/deauthorize a station on a controlled port. The control daemon 117 can run a command or make a system call via the port authorization object 125. The port authorization object 125 provides functions to modify an Ethernet frames rules table in the kernel 113. To allow traffic for a station via a controlled port, the command or call indicates the authenticated MAC address, the controlled port, and an indication of allow or disallow.

At stage J, the port authorization object 125 accesses the Ethernet frames rules table according to the command of the control daemon 117. If traffic of an authenticated/associated station is being authorized on a controlled port, then the port authorization object 125 installs a rule in a rule chain of the Ethernet frames rules table. If traffic of a disassociated station is being deauthorized on a controlled port, then the port authorization object 125 removes a previously installed rule that authorized traffic for the station before being disassociated.

Figure 2:
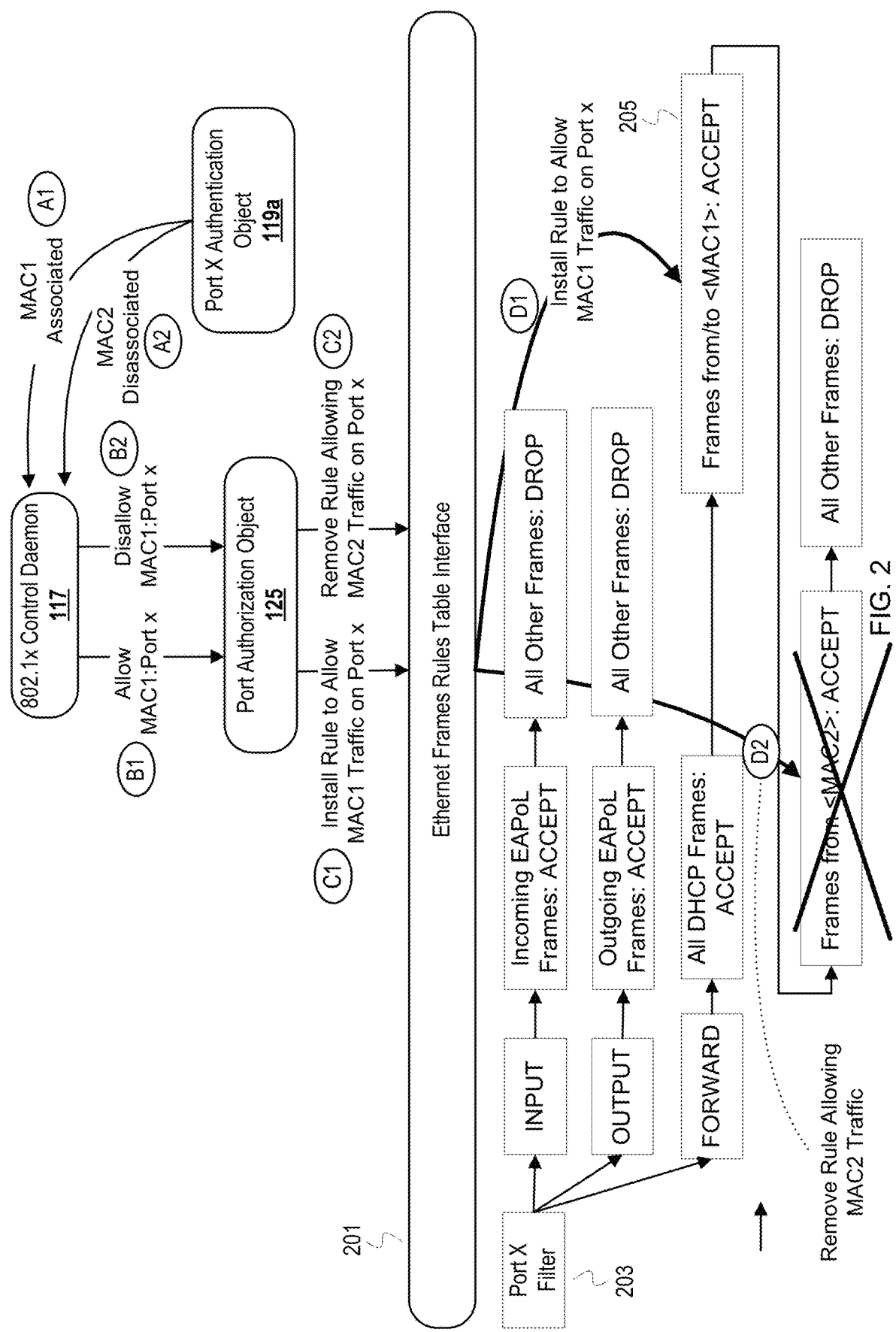
FIG. 2 is a conceptual diagram of the 802.1X control daemon accessing an Ethernet frames rules table to allow and disallow traffic on a controlled port for stations.

FIG. 2 is a conceptual diagram of the 802.1X control daemon accessing an Ethernet frames rules table to allow and disallow traffic on a controlled port for stations. FIG. 2 depicts the control daemon 117 and the port authorization object 125 from FIG. 1. The Port X authentication object 119a is also depicted. This example illustrates authorization operations for a station with MAC address MAC1 that is associated and deauthorization for a station with MAC address MAC2 that has been disassociated. As in FIG. 1, stages of operations are depicted to aid in illustrating the process. FIG. 2 only depicts a filter table 203 for port x. The kernel will maintain an Ethernet frames rules table for each controlled port. It is assumed for this illustration that insertion of a rule into a chain is at a front of the chain and rules are evaluated from front to back of the chain. Thus, a first default rule is inserted and then as new rules are inserted into a chain the first default rule is shifted to the back to be evaluated last when no other rule in the chain matches. This is one technique that implicitly gives higher priority to station specific rules. Regardless the technique, the Ethernet frames rules table is maintained to evaluate station specific rules prior to a default rule that drops all traffic.

At stage A1, the authentication object 119a indicates to the control daemon 117 that the station with address MAC1 has been associated with a network access point hosting the control daemon 117. This indication may be an IPC notification/message.

At stage B1, the control daemon 117 calls a function of the port authorization object 125 to allow traffic on port x from a station with the MAC address MAC1. The control daemon 117 populates the parameters of the function call with the MAC1 address, the port x identifier, indication of allow, and a table identifier. For example, the parameter can indicate "filter" to specify the rule chain for the filter table, assuming there are other tables such as a NAT table and a broute table. Based on the existence of other default rules and the traversal of rule chains when applied, inserts default to the beginning of a chain. However, implementations can also specify an ordinality parameter for more granular management of rule maintenance.

At stage C1, execution of the function call defined by the port authorization object 125 creates and submits a command via an interface to implement the request or command from the control daemon 117. Based on the parameters in the function call, a command is formulated according to the specification of an interface 201 for the Ethernet frames rules table to insert a rule into the Ethernet frames rules table. This may involve using certain flags in a command to specify the filter table and for arranging the parameters that form the command according to the specification of the interface 201. The command will insert a rule(s) into a filter table 203 to allow traffic from MAC1 on port x.

At stage D1, submission of the command via the interface 201 selects the filter table corresponding to port x (which in this illustration is table 203) and generates a rule 205. The interface 201 inserts the rule 205 into a FORWARD rule chain of the filter table 203. In FIG. 2, the filter table 203 includes three chains of firewall rules or rule chains: an INPUT chain, an OUTPUT chain, and a FORWARD chain. Using the application ebtables as a reference, the INPUT chain includes rules to be applied to frames destined for the network access point 109. The OUTPUT chain includes rules to be applied to locally generated frames. The FORWARD chain includes rules to be applied to frames being forwarded by the network access point 109, which will be the bulk of traffic from connected stations. Each rule specifies a criterion and a policy (or target in the ebtables terminology). Some of the policies include ACCEPT, DROP, and CONTINUE. ACCEPT informs the network access point to allow a frame through. DROP informs the network access point to drop a frame. CONTINUE causes the network access point to continue to the next rule in the chain. Thus, the command submitted via the interface 201 will insert the rule 205 into the FORWARD chain of the filter table with a target of ACCEPT. The criteria will be that the source MAC address matches MAC1 and is received via logical port x (i.e., the controlled port). An example of the commands according to ebtables would be -i eth0 -s MAC1 -j ACCEPT to indicate that frames incoming on the ethernet interface eth0 from MAC1 are to be allowed. Additional rules may be inserted, but are not illustrated due to space constraints on the drawing sheets. A second rule inserted into the FORWARD chain is a rule to allow outgoing traffic via the ethernet interface and destined for MAC1. In addition to the FORWARD chain, rules are inserted for MAC1 traffic in the INPUT and OUTPUT chains (not illustrated due to drawing space constraints). In the INPUT chain, a rule is inserted to allow incoming traffic on the ethernet interface from MAC1. In the OUTPUT chain, a rule is inserted into the filter table to allow outgoing traffic on the ethernet interface destined for MAC1. The control daemon 117 may be programmed to generate a single request or a request per rule chain. The port authorization object 125 will be programmed to generate one or more commands to update all of the rule chains of the filter table depending upon the interface 201.

For a deauthorization example, the authentication object 119a indicates to the control daemon 117 that the station with address MAC2 has been disassociated from the network access point at stage A2. This indication may be an IPC notification or setting a value at a memory location monitored by the control daemon 117.

At stage B2, the control daemon 117 calls a function of the port authorization object 125 to disallow traffic on port x from/to a station with the MAC address MAC2. The control daemon 117 populates the parameters of the function call with the MAC2 address, indication of disallow, and a port identifier. It is not necessary to populate the parameters with an indication of the table since the remove command for each rule matching the MAC2 address is removed across chains.

At stage C2, execution of the function call defined by the port authorization object 125 creates and submits a command via the interface 201 to implement the disallow request or command from the control daemon 117. Based on the parameters in the function call, a command is formulated according to the specification of the interface 201 for the Ethernet frames rules table to remove a rule(s) from the Ethernet frames rules table. This may involve using certain flags in a command to specify the filter table and for rule removal.

At stage D2, submission of the command via the interface 201 causes the interface 201 to find a matching rule in any chain and delete the rule. For ease of explanation, only deletion of a matching rule from the FORWARD chain is depicted. The parameter of the command indicating the address MAC2 is used to search the FORWARD rule chain for a rule with a criterion that specifies MAC2. When that rule is found, the rule is removed. This relies on a default rule in the FORWARD chain, which is the last rule in the FORWARD chain. This last rule specifies that all frames on port X are to be dropped. When the allowance rule for MAC2 is removed, this last default rule will be applied to traffic from MAC2 which prevents that traffic from being forwarded to another network or network segment.

In addition to the default rule that blocks traffic from unauthenticated stations from being forwarded, the control daemon 117 has set other default rules in the filter table 203. To block unauthorized traffic while allowing EAPoL frames, the control daemon 117 sets (via the port authorization object 125 and the interface 201) rules in the INPUT and OUTPUT chains to allow incoming and outgoing EAPoL frames (e.g., the criterion indicates frame protocol or ether type 0x888E) on the ethernet interface corresponding to the rules table. Another default rule set by the control daemon 117 is a rule in the FORWARD chain that allows DHCP frames. The kernel recognizes DHCP traffic based on source and destination ports (68 and 67 in user datagram protocol (UDP) packets). A last default rule in all chains is set to drop frames when no other rule in the chain is matched.

Figure 3:
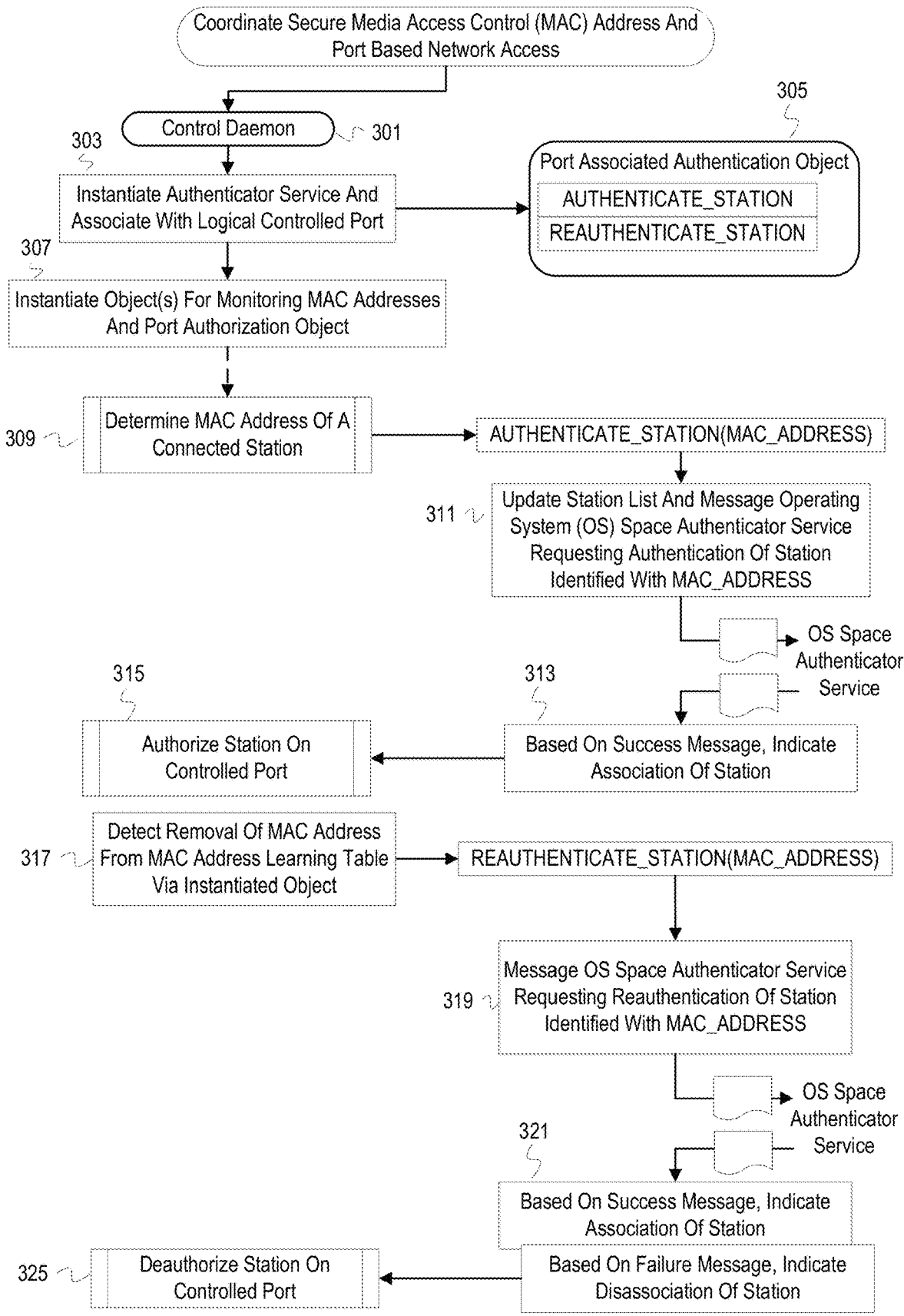
FIG. 3 is a flowchart of example operations for coordinating secure MAC address and port based network access.

FIG. 3 is a flowchart of example operations for coordinating secure network access based on MAC address and controlled port. FIG. 3 depicts a control daemon 301 and a port associated authentication object 305 as software components that perform different ones of the example operations. This illustrates the coordination across components of the MAC address and secure port-based network access authentication and authorization architecture. Also, FIG. 3 includes multiple starting points. Operations may begin based on a new MAC address or deletion of a MAC address (e.g., due to age out of a station).

At block 303, the control daemon 301 instantiates the authentication object 305 and associates the authentication object 305 with a logical controlled port. The logical port is configured by startup code, script, or manual configuration. Additional configuration enables or disables 802.1X for the logical port. These configurations occur external to the control daemon 301. The instantiated authentication object 305 exposes at least 2 functions that can be called by the control daemon 301: an AUTHENTICATE_STATION function and a REAUTHENTICATE_STATION function.

At block 307, the control daemon 301 instantiates an object(s) for MAC address monitoring and an object for port-based traffic authorization. Examples of the object for MAC address monitoring include a DHCP snooper and an object related to the MAC address table of the corresponding network access point. An example of the port authorization object is an object with functions that submit commands to run the ebtables application to inspect or modify the rules.

Figure 4:
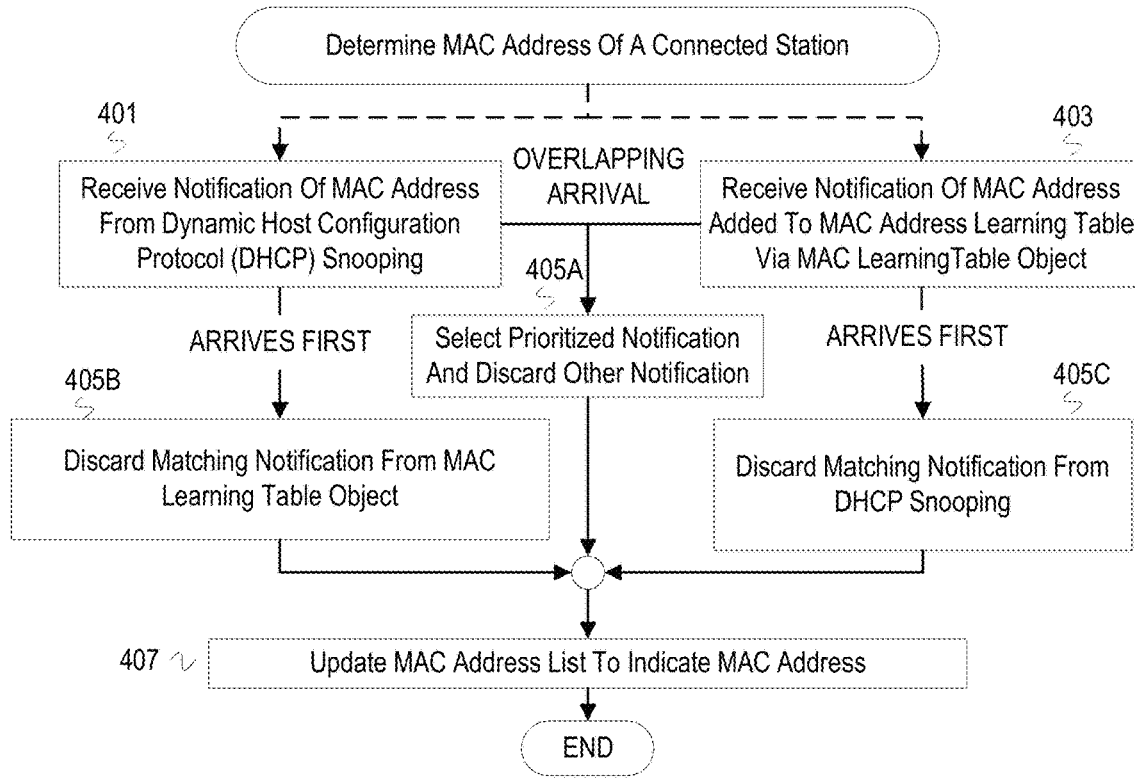
FIG. 4 is a flowchart of example operations for determining a MAC address of a connected station in a station authentication and authorization architecture external to a kernel.

At block 309, the control daemon 301 determines a MAC address of a connected station. This can be from MAC learning and/or DHCP snooping depending upon what has been instantiated and what has been detected. The line from block 307 to block 309 is dashed since this operation is asynchronous with respect to the other operations. FIG. 4 provides elaboration on this example operation. When a MAC address is determined, the control daemon 301 calls the AUTHENTICATE_STATION function of the authentication object 305. A control daemon 301 populates the function call with a parameter/argument that specifies the determined MAC address.

At block 311, the authentication object 305 messages an authenticator service of the OS requesting authentication of the station identified with the MAC address in the function call. Execution of the AUTHENTICATE_STATION function causes the message to be sent to the OS space authenticator service. Execution of the AUTHENTICATE_STATION function also causes the authentication object 305 to update a station list, which is/comprises a data structure used to track stations by MAC address for which authentication has been requested or completed. If authentication fails, then the corresponding MAC address is removed from the station list. Flags or values indicating state of authentication (e.g., initiated, completed) can also be indicated in the station list.

If authentication is successful, the OS space authenticator service returns a message that indicates association of the station. At block 313, the authentication object 305 conveys the association to the control daemon 301. Indication of the association or successful authentication can vary by implementation. As mentioned previously, the authentication object 305 may maintain authentication state for each MAC address indicated in the station list.

Figure 5:
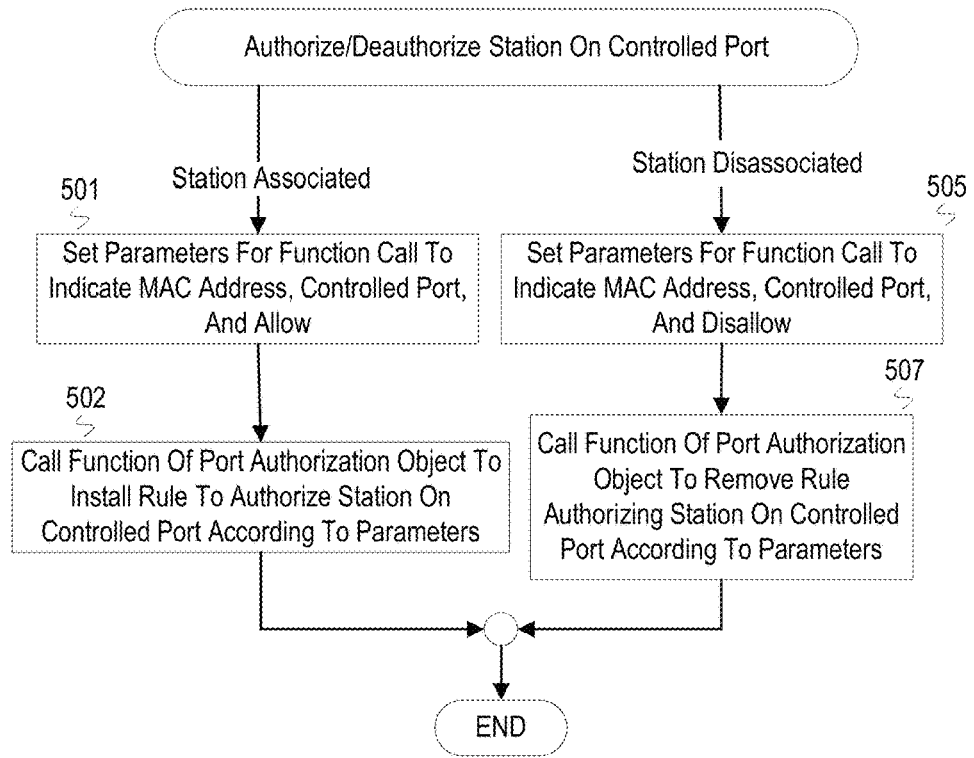
FIG. 5 is a flowchart of example operations for authorizing/deauthorizing a station on a controlled port using the Ethernet frames rules table.

At block 315, the control daemon 301 authorizes the authenticated station on the controlled port associated with the authentication object 305. FIG. 5 provides example operations that elaborate on block 315.

At block 317, the control daemon 301 detects removal of a MAC address via the instantiated object for MAC address monitoring. Assuming the instantiated object receives notifications of changes to the MAC address table, then the kernel will generate a notification to the instantiated object when a station has aged out. This notification from the kernel causes the object to execute a function that conveys the notification to the control daemon 301 along with the corresponding MAC address. To both prevent delay in the station from being able to transmit traffic by allowing the station to remain authorized but also preserve security of network access, the control daemon 301 calls the REAUTHENTICATE_STATION function with the MAC address of a removed or aged out station as an argument. Calling this function causes a message to be sent to the OS space authenticator service requesting reauthentication of the aged out station at block 319.

Receipt of a message from the OS space station in response to the reauthentication request message will trigger execution of another function of the authentication object 305 depending upon whether the reauthentication was successful or not. Based on a success message for the reauthentication, no operation is performed which implies successful authentication. An implementation can indicate association of the station to the control daemon 301 at block 321 by updating an authentication or re-authentication flag/value in the station list. With success of a reauthentication request, the control daemon does not take further action since the station is still authorized in the Ethernet frames rules table. If the reauthentication was not successful, then disassociation of the station is indicated to the control daemon 301 at block 323.

At block 325, the control daemon 301 deauthorizes the station on the controlled port based on the indication of disassociation. FIG. 5 provides example operations that elaborate on block 325.

FIG. 4 is a flowchart of example operations for determining a MAC address of a connected station in a station authentication and authorization architecture external to a kernel. For FIG. 4, it is assumed that a DHCP snooper and a MAC address table object have been instantiated. The dashed arrows to blocks 401 and 403 indicate asynchronous operations. FIG. 4 is described from the perspective of a control daemon coordinating notifications/events across components of the authentication and authorization architecture.

At block 401, the control daemon receives notification of a MAC address from a DHCP snooper. The control daemon previously instantiated or registered with the DHCP snooper to receive notifications of DHCP requests indicating MAC addresses. The DHCP snooper is used since a network access point will likely detect a DHCP message soon after a station connects to the network access point. The DHCP snooper will extract the MAC address from the DHCP request and convey that to the control daemon.

At block 403, the control daemon receives notification that the network access point has learned a MAC address (i.e., a MAC address has been added to the address learning table). The control daemon previously instantiated the MAC address table object and detects changes to the address table of the kernel.

These notifications may correspond to same station and can be received in various permutations of time. If the notifications are received concurrently or within a small, defined contention window (e.g., 5 milliseconds) of each other, then control flows to block 405A. If the notification from the DHCP snooper is received before the notification from the MAC address table object, then control flows to block 405B. If the notification from the MAC address table object arrives first, then control flows to block 405C.

At block 405A, the control daemon selects a prioritized one of the notifications and discards the other when the notifications have an overlapping arrival. The control daemon can be configured/programmed to prioritize one of the notifications, for example the notification from the MAC address table object, over the other. The control daemon then uses the MAC address of this notification for additional operations depicted in FIG. 3.

At block 405B, the control daemon discards the notification for the same MAC address from the MAC address table object. The control daemon uses the MAC address from the DHCP snooper for the additional operations depicted in FIG. 3.

At block 405C, the control daemon discards the notification for the same MAC address from the DHCP snooper. The control daemon uses the MAC address from the MAC address table object for the additional operations depicted in FIG. 3.

At block 407, the control daemon updates the MAC address table maintained in the memory space of the control daemon to indicate the determined MAC address. For instance, the control daemon can invoke a function of the MAC address table object to update the control daemon's MAC address table with the determined MAC address.

FIG. 5 is a flowchart of example operations for authorizing/deauthorizing a station on a controlled port using the Ethernet frames rules table. To conserve drawing space, the authorize and deauthorize execution paths are depicted in FIG. 5.

At block 501, the control daemon sets parameters for an authorize function call in response to indication of a station being associated (i.e., successful authentication). The control daemon sets the parameters to indicate the MAC address of the authenticated station, the controlled port on which traffic will be allowed, and indication of allow for the traffic. The control daemon can also indicate a rule number to install the rule for any default rules of a rule chain.

At block 502, the control daemon calls the authorize function of the MAC address learning object with the set parameters. The called function causes a rule(s) to be installed in the Ethernet frames rules table according to the parameters. For instance, the call by the control daemon causes the MAC address learning object to install 2 allow rules in a FORWARD chain, an allow rule in an INPUT chain, and an allow rule in an OUTPUT chain with the address of the authenticated station so that the rules are applied when a frame matching the address of the authenticated station is encountered.

At block 505, the control daemon sets parameters for a deauthorize function call in response to indication of a station being disassociated (i.e., failed authentication). The control daemon sets the parameters to indicate the MAC address of the disassociated station, the controlled port, and indication of disallow for the traffic.

At block 507, the control daemon calls the deauthorize function of the MAC address learning object with the set parameters. The called function causes a rule with a criterion matching the indicated MAC address to be removed from the Ethernet frames rules table. For instance, the command can be created with a delete flag.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
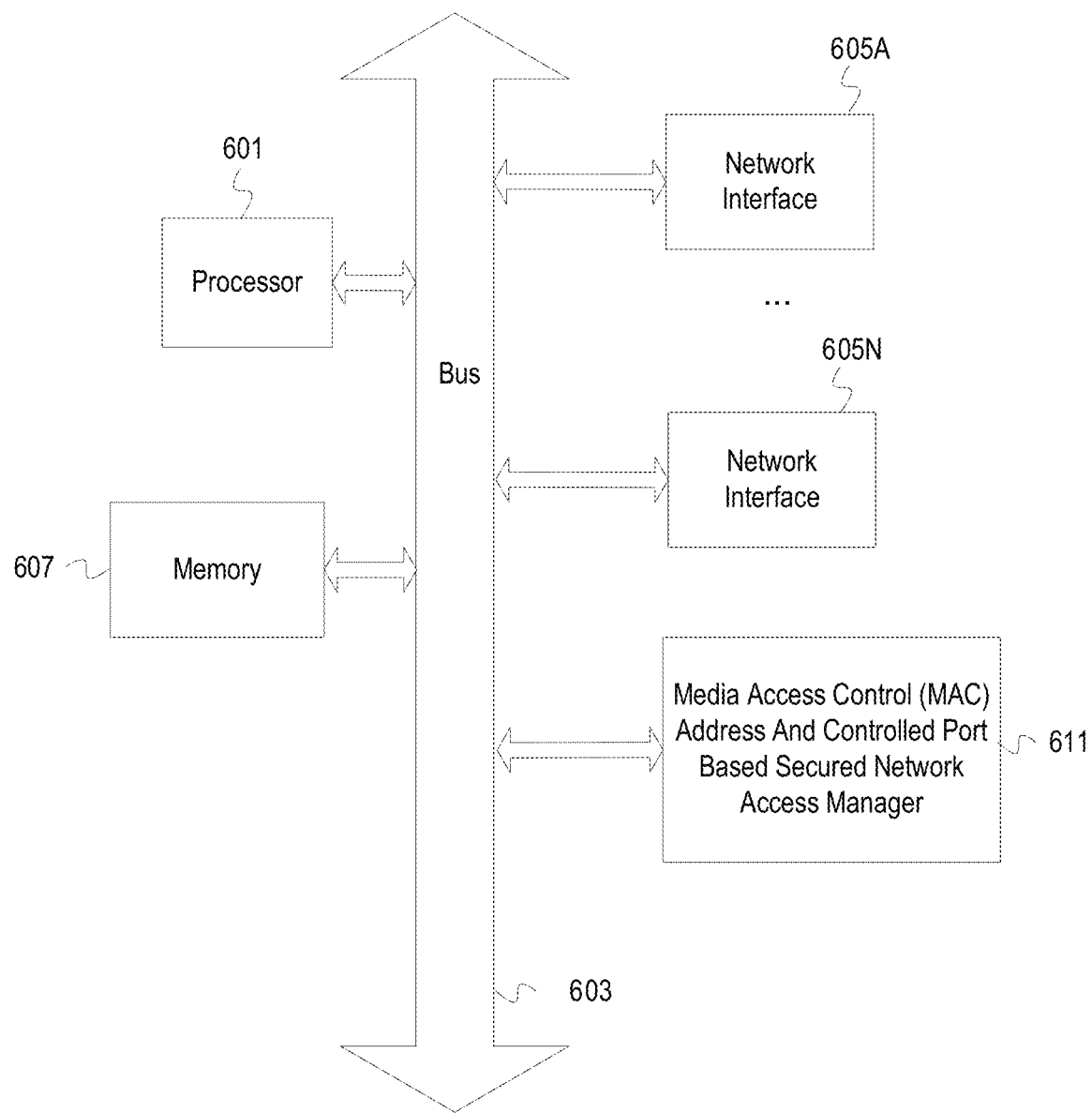
FIG. 6 depicts an example network access point with a MAC address and controlled port based secure network access manager. Description

FIG. 6 depicts an example network access point with a MAC address and controlled port based secure network access manager. The network access point includes a processor 601 (possibly including multiple processors, multiple cores, multiple nodes, and/or implementing multi-threading, etc.). The network access point includes memory 607. The memory 607 may be system memory or any one or more of the above already described possible realizations of machine-readable media. The network access point also includes a bus 603 and network interfaces 605A-605N. The network access point also includes MAC address and controlled port based secure network access manager 611. The MAC address and controlled port based secure network access manager 611 includes the components of the previously described 802.1X based authentication and authorization architecture. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor 601.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   determining a media access control (MAC) address of a first station connected with a network access point that regulates access to a network based on a combination of port and MAC address, wherein the first station is not authenticated for access to the network,
   and wherein the network access point comprises a control daemon, a first authenticator service instantiated by the control daemon and associated with a first port, and a second authenticator service instantiated by an operating system of the network access point;
   based on determining the MAC address of the first station, the control daemon calling a first function to authenticate the first station which causes the first authenticator service to send a message to the second authenticator service to authenticate the first station, wherein the first authenticator service exposes the first function; and
   based on a message from the second authenticator service indicating association of the first station with the network access point, the first authenticator service indicating to the control daemon that the first station has been authenticated on the first port based on the MAC address of the first station.

2. The method of claim 1 wherein determining the MAC address of the first station comprises at least one of MAC address learning via a MAC address object and dynamic host configuration protocol (DHCP) snooping.

3. The method of claim 2, further comprising the control daemon instantiating the MAC address object and listening for MAC addresses via the instantiated MAC address object.

4. The method of claim 2 further comprising the control daemon invoking DHCP snooping via a service exposed by a kernel of the network access point.

5. The method of claim 2 further comprising the control daemon selecting either the MAC address of the first station from the MAC address learning or from the DHCP snooping based on notifications from both the MAC address object and the DHCP snooping.

6. The method of claim 1 further comprising:
   detecting that the MAC address of the first station has been removed from a MAC address table;
   in response to detecting that that MAC address of the first station has been removed, calling a second function exposed by the first authenticator service to disassociate the first station;
   the first authenticator service sending a message to the second authenticator service to disassociate the first station; and
   the first authenticator service indicating to the control daemon that the first station has been disassociated based on a message from the second authenticator service indicating that the first station has been disassociated.

7. The method of claim 1 further comprising:
   detecting that the first station has aged out;
   in response to detecting that that the first station has aged out, calling a second function exposed by the first authenticator service to reauthorize the first station; and
   the first authenticator service sending a message to the second authenticator service to reauthorize the first station.

8. The method of claim 1, wherein the first port is shared with a second station that is connected with the network access point and that has been authenticated by the second authenticator service.

9. The method of claim 1 further comprising the control daemon calling a second function exposed by a kernel to allow frames from the first station on the first port in response to the first station being associated.

10. The method of claim 1 further comprising:
    the control daemon initially setting a default first rule in an Ethernet frames rules table that disallows all traffic from any station on the first port, wherein the Ethernet frames rules table is maintained in a kernel; and
    after authentication of the first station, installing a first station specific rule in the Ethernet frames rules table that allows traffic from the first station on the first port, wherein station specific rules have priority over default rules.

11. The method of claim 10 further comprising setting a default second rule in the Ethernet frames rules table that allows Extensible Authentication Protocol over Local Area Network (EAPoL) frames, wherein the second default rule has priority over the first default rule.

12. The method of claim 11 further comprising setting a default third rule in the Ethernet frames rules table that allows dynamic host configuration protocol request frames.

13. The method of claim 10 further comprising removing the first station specific rule in response to disassociation of the first station.

14. The method of claim 1, wherein the first authenticator service controls authentication behavior of the first port and a third authenticator service controls authentication behavior of a second port, wherein the control daemon also instantiated the third authenticator service.

15. A non-transitory machine-readable medium having program code stored thereon, the program code comprising:
first instructions to,
  instantiate second instructions that implement a first authenticator service and
  associate the first authenticator service with a first port in response to detecting enablement of the first port as being subject to port-based network access control;
  detect connection of a first station to a network access point, wherein the instructions to detect connection of the first station comprise instructions to determine a media access control (MAC) address of the first station;
  based on determination of the MAC address of the first station, invoke a first function exposed by the first authenticator service to authenticate the first station;
wherein the second instructions implement the first authenticator service to,
  in response to invocation of the first function, message a second authenticator service to authenticate the first station according to the extensible authentication protocol over local area network (EAPoL), wherein the second authenticator service was instantiated by a kernel of the network access point;
  indicate that the first station is associated based on a message from the second authenticator service that the first station has been authenticated; and
wherein the first instructions are to invoke a second function exposed by the kernel to allow traffic from the first station on the first port in response to the indication that the first station has been associated.

16. The non-transitory machine-readable media of claim 15, wherein the program code further comprises instructions to instantiate a MAC address object and listen for new MAC addresses via the instantiated MAC address object, wherein the instructions to determine the MAC address of the first station comprise instructions to detect a notification of addition of the MAC address of the first station via the MAC address object.

17. The non-transitory machine-readable media of claim 15, wherein the program code further comprises instructions to invoke dynamic host configuration protocol (DHCP) snooping via a service exposed by the kernel, wherein the instructions to determine the MAC address of the first station comprise instructions to detect a notification from the DHCP snooping that indicates the MAC address of the first station.

18. The non-transitory machine-readable media of claim 15, wherein the program code further comprises instructions to instantiate a MAC address object and listen for new MAC addresses via the instantiated MAC address object and instructions to invoke dynamic host configuration protocol (DHCP) snooping via a DHCP interface exposed by the kernel, wherein the instructions to determine the MAC address of the first station comprise instructions to choose either a notification from the MAC address object or a notification from the DHCP snooping to determine the MAC address of the first station when both notifications are received.

19. The non-transitory machine-readable media of claim 15, wherein the program code further comprises instructions to:
  detect that a MAC address has been removed from a MAC address table; and
  in response to detecting that that the MAC address has been removed, invoke a third function exposed by the first authenticator service to disassociate a station corresponding to the removed MAC address, which causes the first authenticator service to message the second authenticator service to disassociate the corresponding station.

20. The non-transitory machine-readable media of claim 15, wherein the program code further comprises instructions to:
  detect that a station has aged out; and
  in response to detecting that that a station has aged out, invoke a third function exposed by the first authenticator service to reauthorize the aged out station, which causes the first authenticator service to message the second authenticator service to reauthorize the aged out station.

21. The non-transitory machine-readable media of claim 15, wherein the program code further comprises instructions to:
  set a default first rule and a default second rule in an Ethernet frames rules table, wherein the default first rule disallows all traffic from any station on the first port and the default second rule allows Extensible Authentication Protocol over Local Area Network (EAPoL) frames, wherein the default second rule has priority over the default first rule, wherein the Ethernet frames rules table is maintained in the kernel;
  in response to authentication of a station, install a station specific rule in the Ethernet frames rules table that allows traffic from the authenticated station on the first port, wherein station specific rules have priority over default rules; and
  in response to disassociation of a station, remove a station specific rule corresponding to the disassociated station.

22. A network access point comprising:
a plurality of physical network interfaces;
a processor; and
a machine-readable medium having stored thereon an operating system including a kernel, control daemon program code, and first authenticator service program code;
the control daemon program code comprising instructions to,
  instantiate the first authenticator service as a first instance of a first authenticator service and associate the first instance of the first authenticator service with a first logical port in response to detecting enablement of the first logical port as being subject to port-based network access control;
  detect connection of a station with the network access point, wherein the instructions to detect connection of the station comprise instructions to determine a media access control (MAC) address of the station;
  based on determination of the MAC address of the station, invoke a first function exposed by the first instance of the first authenticator service to authenticate the station;
the first authenticator service program code comprising instructions to,
  in response to invocation of the first function, message a second authenticator service to authenticate the station according to the extensible authentication protocol over local area network (EAPoL), wherein the second authenticator service was instantiated by the kernel; and in response to a message from the second authenticator service that the station has been associated, indicate that the station has been associated.

23. The network access point of claim 22, wherein the control daemon program code further comprises instructions to:

set a default first rule and a default second rule in an Ethernet frames rules table, wherein the default first rule disallows all traffic from any station on the first port and the default second rule allows Extensible Authentication Protocol over Local Area Network (EAPoL) frames, wherein the default second rule has priority over the default first rule, wherein the Ethernet frames rules table is maintained in the kernel;

in response to authentication of a station, install a station specific rule in the Ethernet frames rules table that allows traffic from the authenticated station on the first port, wherein station specific rules have priority over default rules; and in response to disassociation of a station, remove a station specific rule corresponding to the disassociated station from the Ethernet frames rules table.

* * * * *